(12) United States Patent
Bostwick

(10) Patent No.: US 9,582,793 B2
(45) Date of Patent: Feb. 28, 2017

(54) POINT OF SALE SYSTEM, INVENTORY SYSTEM, AND METHODS THEREOF

(71) Applicant: Peter John Bostwick, Menlo Park, CA (US)

(72) Inventor: Peter John Bostwick, Menlo Park, CA (US)

(73) Assignee: CERTEFI, INC., Palo Alto, CA (US)

( * ) Notice: Subject to any disclaimer, the term of this patent is extended or adjusted under 35 U.S.C. 154(b) by 57 days.

(21) Appl. No.: 14/203,538

(22) Filed: Mar. 10, 2014

(65) Prior Publication Data

US 2014/0252090 A1 Sep. 11, 2014

Related U.S. Application Data

(60) Provisional application No. 61/776,533, filed on Mar. 11, 2013, provisional application No. 61/776,582, filed on Mar. 11, 2013, provisional application No. 61/776,615, filed on Mar. 11, 2013.

(51) Int. Cl.
*G06F 17/00* (2006.01)
*G06Q 20/20* (2012.01)
*G06Q 10/08* (2012.01)
*A47F 9/04* (2006.01)
*G07G 1/00* (2006.01)
*G07G 1/01* (2006.01)

(52) U.S. Cl.
CPC ............ *G06Q 20/203* (2013.01); *A47F 9/04* (2013.01); *A47F 9/047* (2013.01); *G06Q 10/087* (2013.01); *G06Q 20/20* (2013.01); *G07G 1/0045* (2013.01); *G07G 1/01* (2013.01)

(58) Field of Classification Search
USPC ........ 235/375, 379, 380, 383; 705/14.51, 28
See application file for complete search history.

(56) References Cited

U.S. PATENT DOCUMENTS

| | | |
|---|---|---|
| 8,856,045 B1 | 10/2014 | Patel et al. |
| 9,171,300 B2 | 10/2015 | Westby et al. |
| 2004/0211600 A1* | 10/2004 | Schuller ............ G01G 19/4144 177/25.15 |
| 2005/0283259 A1 | 12/2005 | Wolpow |

(Continued)

OTHER PUBLICATIONS

International Search Report and Written Opinion mailed Jul. 24, 2014, issued in PCT/US2014/023823 filed Mar. 11, 2014, 18 pages.

(Continued)

*Primary Examiner* — Michael G Lee
*Assistant Examiner* — Tabitha Chedekel
(74) *Attorney, Agent, or Firm* — Harness, Dickey & Pierce, P.L.C.

(57) ABSTRACT

A method for conducting a purchase transaction using a wireless communication device, includes: receiving from a mobile application module executing on a wireless communication device instructions to initiate a purchase transaction by a server application; verifying and authorizing the mobile application module by the server application; receiving from the mobile application module identification information about an item to be purchased to the server application; retrieving via the server application at least one of price and product information based on the identification information; and completing the purchase transaction by automatically electronically debiting a user account.

4 Claims, 12 Drawing Sheets

(56) References Cited

U.S. PATENT DOCUMENTS

2006/0293978 A1     12/2006   Godlewski
2007/0235531 A1     10/2007   Addison et al.
2012/0123675 A1      5/2012   Parker, II
2012/0271712 A1*   10/2012   Katzin .................. G06Q 30/06
                                                                705/14.51

OTHER PUBLICATIONS

U.S. Appl. No. 14/203,532, filed Mar. 10, 2014, Peter John Bostwick.
U.S. Appl. No. 14/203,544, filed Mar. 10, 2014, Peter John Bostwick.
U.S. Appl. No. 14/582,014, filed Dec. 23, 2014, Peter John Bostwick.

* cited by examiner

POINT OF SALE SYSTEM, INVENTORY SYSTEM, AND METHODS THEREOF

CROSS-REFERENCE TO RELATED APPLICATION(S)

This application claims the benefit of U.S. provisional application No. 61/776,533, filed Mar. 11, 2013, U.S. provisional application No. 61/776,582, filed Mar. 11, 2013, and U.S. provisional application No. 61/776,615, filed Mar. 11, 2013, the disclosures of which are hereby incorporated in their entireties by reference.

BACKGROUND

1. Technical Field

Apparatuses and methods consistent with the present inventive concept relate to point-or-sale operations, and more particularly to systems and methods for self-service or assisted customer check-out and inventory monitoring.

2. Related Art

A point of sale is the place where a retail transaction is completed, for example, a check out area in a retail store at which a customer makes a payment to the merchant in exchange for goods or services. At the point of sale, an amount due from the customer for the goods or services to be purchase is calculated, options for payment are provided, and a receipt for the transaction is issued. Typical point of sale areas provide dedicated terminals for attended (i.e., cashier-assisted) checkout and/or dedicated terminals for self-service checkout, thereby lacking flexibility of use.

In addition, inventory management presents a challenge for businesses. Efficient inventory management requires oversight of the continuous flow of product into and out of an existing inventory. Managing inventory typically requires one or more employees to dedicate time to physically locate and count product on hand, generate inventory reports, place purchase orders to replenish stock, and track the orders.

SUMMARY

Apparatuses, systems, and methods for a point-of-sale and inventory monitoring are provided.

According to an aspect of the present inventive concept there is provided a point-of-sale system. The point-of-sale system may include: a server that may execute a point-of-sale application; a mobile communication device that may execute a point-of-sale mobile application module; and wireless communication apparatuses that may enable communication between the server and the mobile communication device. The point-of-sale application and the point-of-sale mobile application module may perform check-out operations.

According to another aspect of the present inventive concept there is provided a method for conducting a purchase transaction using a wireless communication device. The method for conducting a purchase transaction using a wireless communication device may include: receiving from a mobile application module executing on a wireless communication device instructions to initiate a purchase transaction by a server application; verifying and authorizing the mobile application module by the server application; receiving from the mobile application module identification information about an item to be purchased to the server application; retrieving via the server application at least one of price and product information based on the identification information; and completing the purchase transaction by automatically electronically debiting a user account.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

In a café or other business location one or more self-service check-out terminals, attended check-out terminals, or combination self-service/attended check-out terminals, or any combination thereof may be in use for customer check-out. In addition, customer check-out may be accomplished using a mobile device, for example, but not limited to, a mobile phone or tablet without use of one of the above terminals. Inventory may also be monitored. The check-out and inventory functions may be provided by a software/firmware modules and units which provide various operating modes for the point-of-sale system.

Figure 1:
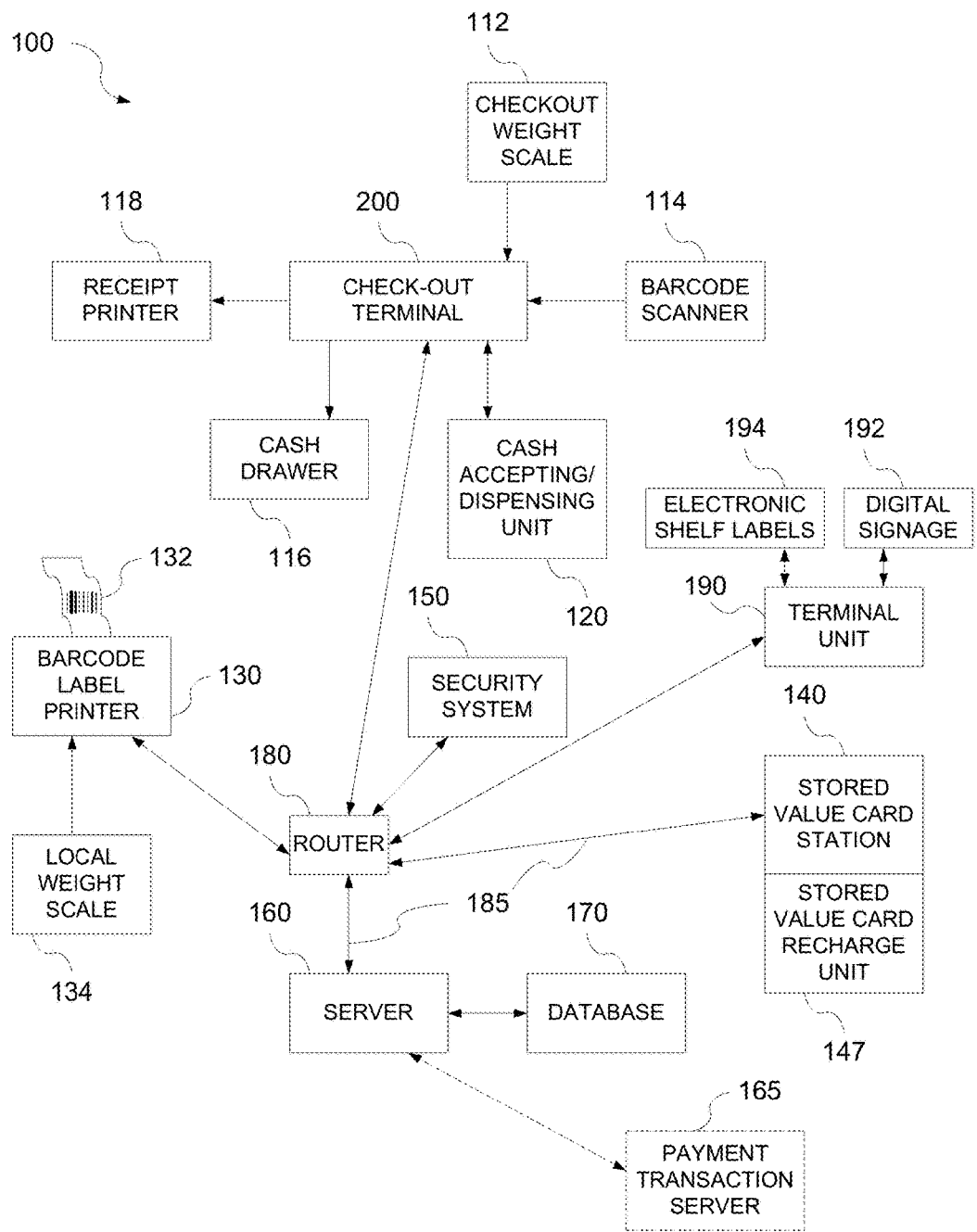
FIG. 1 is a block diagram illustrating a point-of-sale system according to an example embodiment of the present inventive concept.

FIG. 1 is a block diagram illustrating a point-of-sale system according to an example embodiment of the present inventive concept. The point-of-sale system 100 may include a check-out terminal 200, a barcode label printer 130, a stored value card station 140, a security system 150, a server 160, a database 170, and a router 180. The router 180 may interconnect the components of the point of sale system 100 via a network 185. The network 185 may be a wireless network, a wired network, or a combination of wired and wireless network. One of ordinary skill in the art will appreciate that various network technologies and/or protocols for wire and/or wireless communication may be used without departing from the scope of the present inventive concept.

The barcode label printer 130 may be used to print barcode labels 132 to identify products that are stocked for sale. For products that contain more than one item, the barcode label 132 may be associated with a bill of materials (BOM) such that when the barcode is scanned into the point-of-sale system 100, the BOM is "exploded" to list the individual items contained in the product. In addition, the barcode label printer 130 may communicate via a wired or wireless connection with a local weight scale 134 for weighing variable weight items and print the appropriate barcode label 132 to identify the product for check-out.

The stored value card station 140 may be a separate station for process transactions using only credit cards and/or stored value cards, and is further described below.

The security system 150 may include a variety of video cameras, monitors, and alarms (not shown) known to those of ordinary skill in the art to monitor activity at various parts of the point-of-sale system 100, for example, but not limited to, the check-out terminal 200 and the stored value card station 140, as well as other areas of the premises. The security system 150 may also include a web accessible digital video recorder (DVR) (not shown) to facilitate remote surveillance and monitoring of the location. The security system 150 may also monitor temperature sensors to monitor freezers, refrigeration units, and power monitors to detect loss of power.

The server 160 may communicate with and control the checkout terminal 110, the stored value card station 140, the barcode label printer 130, and the security system 150 over the network 185 via the router 180. One of ordinary skill in the art will appreciate that the server may be a computer, general-purpose processor, or any conventional processor or controller, and may include associated display devices, storage devices, and human interface devices known to those skilled in the art.

The server 160 may access the database 170 to provide information, for example, but not limited to, product description information, price information, inventory information, authorization/verification information, etc., to the various components of the point-of-sale system 100. The server 160 may also execute application programs for operation of the point-of-sale system 100. One of ordinary skill in the art will appreciate that the server 160 may serve thin-client applications that may execute on the various components of the point-of-sale system 100 as well as applications executing on customer mobile devices. The server 160 may communicate with a payment transaction server 165 via a secure payment application to obtain payment for transactions.

The database 170 may store information, for example, but not limited to, product description information, price information, inventory information, authorization/verification information, etc.

The point-of-sale system 100 may further include a terminal unit 190 that may control and/or monitor other devices, for example, but not limited to, digital signage 192 that displays product information and features, and electronic shelf labels 194 that display pricing and product information.

The point-of-sale system 100 may also include a checkout weight scale 112, a barcode scanner 114, a cash drawer 116, a receipt printer 118, and a cash accepting and dispensing unit 120, all of which may be located in proximity to the check-out terminal 200.

Figure 2:
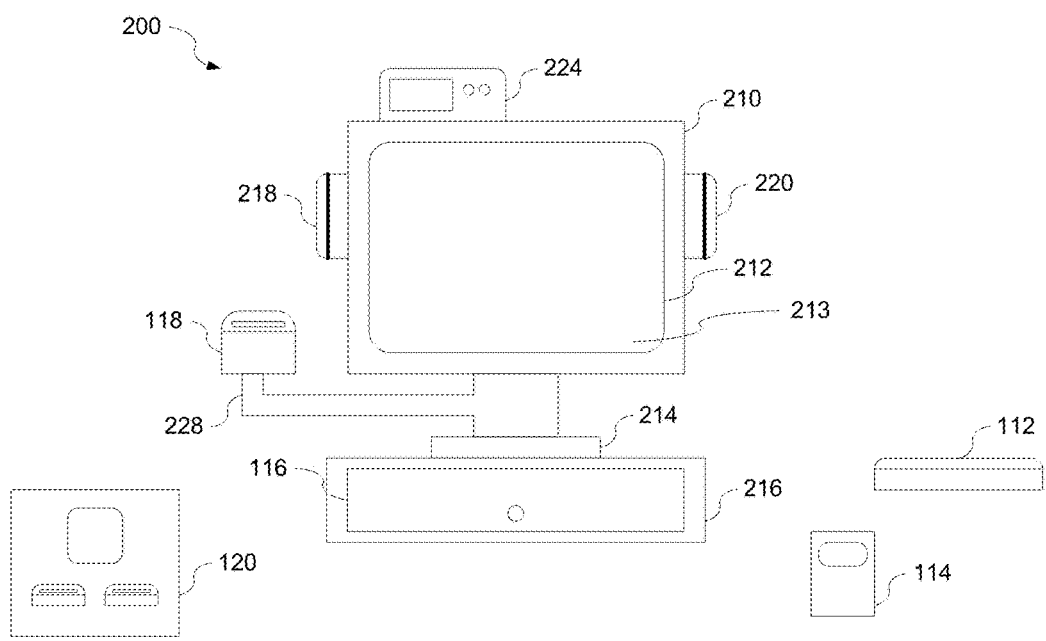
FIG. 2 is an illustration of a check-out terminal according to an example embodiment of the present inventive concept.

FIG. 2 is an illustration of a check-out terminal according to an example embodiment of the present inventive concept. With reference to FIGS. 1 and 2, the check-out terminal 200 may include a video terminal 210 having a display screen 212 and a touch screen 213, a rotatable base 214 disposed on an enclosure 216, one or more magnetic stripe readers 218, 220.

The video terminal 210 may include a general-purpose processor, microprocessor, or any conventional processor or controller (not shown) that may execute application programs for conducting point of sale operations. The video terminal 210 may also include interface and communication components known to those skilled in the art to provide wired and/or wireless communication and/or control of various point-of-sale system 100 components, for example, but not limited to the one or more magnetic stripe readers 218, 220, the checkout weight scale 112, the barcode scanner 114, the cash drawer 116, the display unit 224, the receipt printer 118, the cash accepting and dispensing unit 120, etc.

The one or more magnetic stripe readers 218, 220, may be included to conduct transaction using, for example, but not limited to, credit cards, debit cards, stored value cards, authorized identification badges, etc. The magnetic stripe readers 218, 220 may be attached to the video terminal 210 or may be separate from the video terminal 210. The magnetic stripe readers 218, 220 may also read identification cards to permit verification of user identity and authorization to operate the check-out terminal 200 in an attended-mode.

The magnetic stripe readers 218, 220 may communicate with the video terminal 210 via a wired or wireless connection. Transactions may also be conducted via mobile devices communicating wirelessly with the check-out terminal 200 via wireless protocols, for example, but not limited to, Bluetooth. One of ordinary skill in the art will appreciate that many wired and wireless protocols are known and may be used for wireless communication between various elements of the point-of-sale system 100 and between the check-out terminal 200 and external wireless devices without departing from the scope of the present inventive concept.

The magnetic stripe readers 218, 220 may be encrypted readers for reading the magnetic stripes of credit cards.

Since some of the cards that are read may not credit cards, point-of-sale system 100 may include a system that determines the type of card being read and, if not a credit card, decrypts the information and sends the information to the correct processing system.

The barcode scanner 114 may be configured as a handheld scanner or may be disposed within a structure. The barcode scanner 114 may scan barcodes and transmit barcode information to the video terminal 210 via a wired or wireless connection.

The checkout weight scale 112 may communicate via wired or wireless connection with a display unit 224 to display the weight and/or price of a product, and may communicate with the check-out terminal 200. The check-out terminal 200 may calculate a cost based on a weight of a product. Product information and price per unit of weight may be stored in a memory (not shown) of the weight scale 112 or may be requested and obtained from the server 160.

Figure 3:
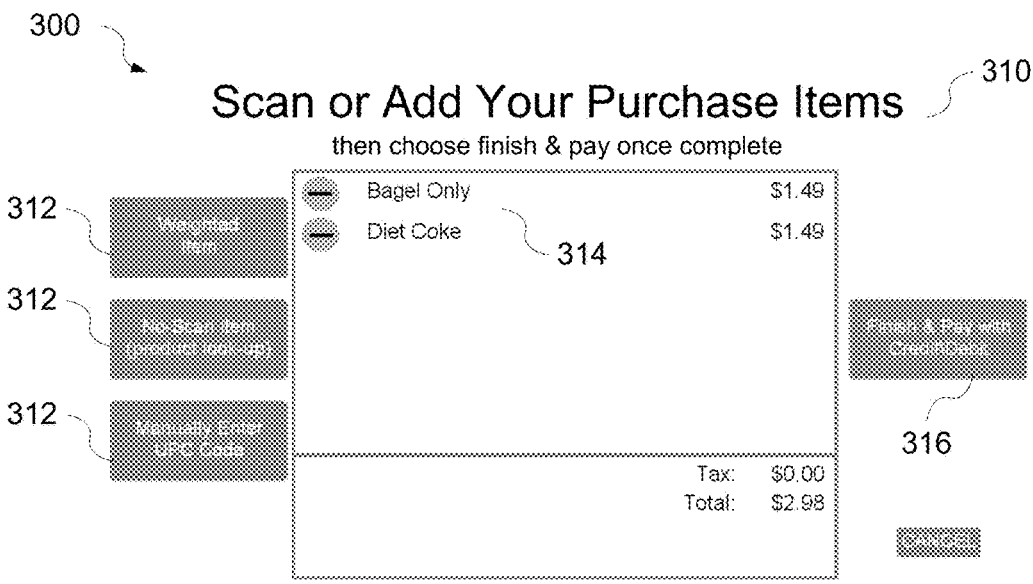
FIG. 3 illustrates an item entry screen display for entering items to be purchased according to an example embodiment of the present inventive concept.
Figure 4:
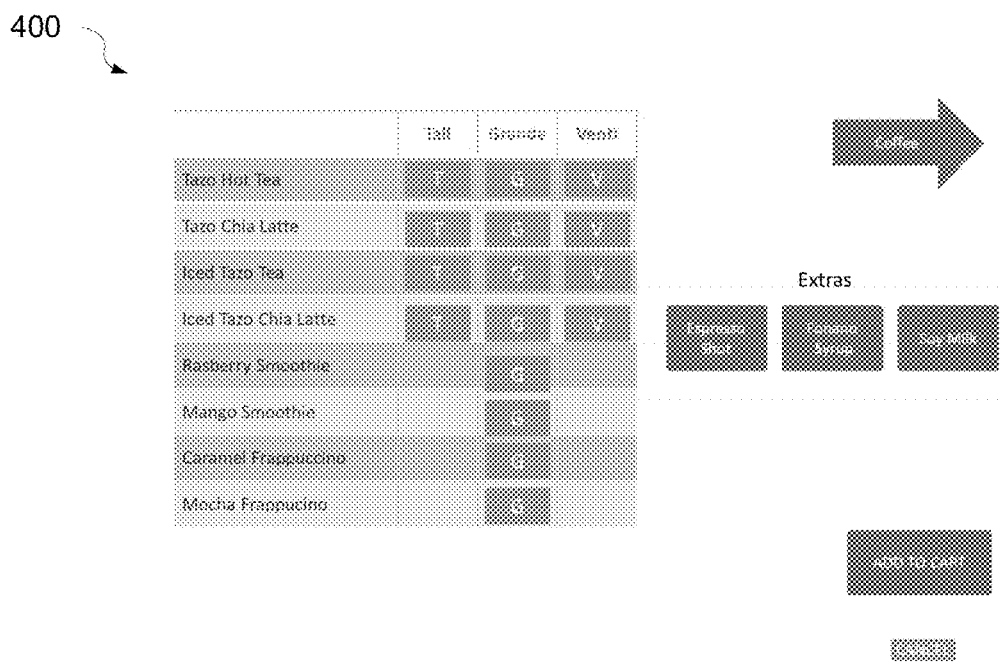
FIG. 4 illustrates a product selection screen display for selecting a customized item according to an example embodiment of the present inventive concept.
Figure 5:
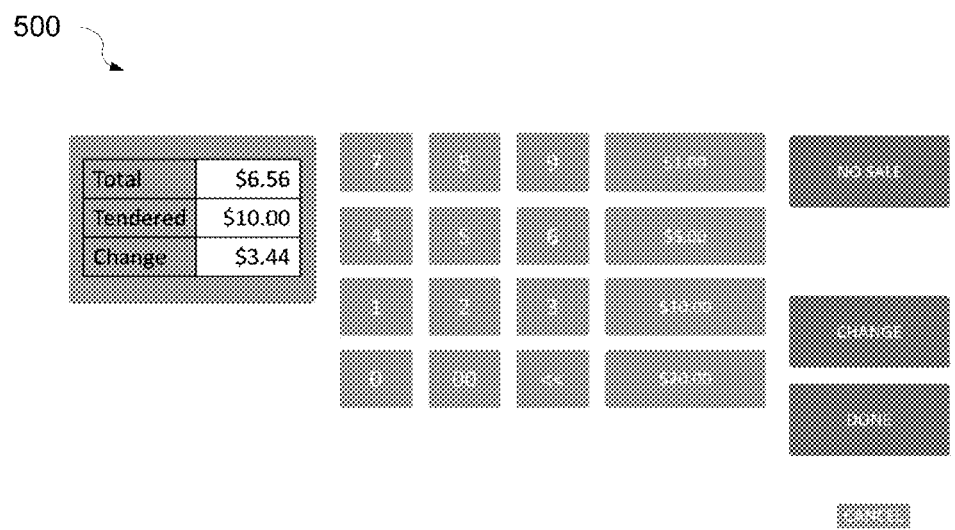
FIG. 5 illustrates a keypad entry screen display for entering numerical values according to an example embodiment of the present inventive concept.

The touch screen 213 permits user input in conjunction with information displayed on the display screen 212. FIGS. 3-5 illustrate information displayed on the display screen 212 and areas for user input via the touch screen 213. FIG. 3 illustrates an item entry screen display for entering items to be purchased according to an example embodiment of the present inventive concept. The display screen 212 may display an item entry screen 300 that may include instructions 310 to provide operational guidance and touch screen input areas 312. As items to be purchased are entered by, for example, but not limited to, scanning with the barcode scanner 114 or weighing with the checkout weight scale 112, the items are displayed 314 on the display screen. A touch screen area 316 may be touched to finish item entry and pay for the items to be purchased.

FIG. 4 illustrates a product selection screen display 400 for selecting a customized item according to an example embodiment of the present inventive concept, and FIG. 5 illustrates a keypad entry screen display 500 for entering numerical values according to an example embodiment of the present inventive concept. One of ordinary skill in the art will appreciate that FIGS. 3-5 provide only a few examples of information that may be displayed areas for user input and that many other configurations are possible without departing from the scope of the present inventive concept.

Referring again to FIGS. 1 and 2, the enclosure 216 may include the cash draw 116. The cash draw 116 may be opened or closed depending on the nature of a point of sale transaction and the operational mode of the check-out terminal 200. Locking and unlocking of the cash drawer 116 may be controlled by the video terminal 210 based on the operational mode of the check-out terminal 200.

The receipt printer 118 may be located in close proximity to the check-out terminal 200. The printer 126 may communicate via wired or wireless connection with the check-out terminal 200 for printing receipts, coupons, notices, product information, nutritional tips, as well as other information and advertising material. Alternatively or additionally, an electronic receipt and other information may be generated and transmitted by the server 160 via e-mail, short message service (SMS), or other electronic means.

In an attended mode of operation the check-out terminal 200 may be operated by an authorized user, for example a cashier, that logs on to the video terminal 210. User authorization may be initiated by a user swiping an identification badge through one of the magnetic stripe readers 218, 220, and/or by accessing an authorization display screen on the video terminal 210 and entering an identification code. The identification information may be sent to the server 160 and compared to information in the database 170 to verify the user identification. If the server 160 determines that the user is identified and authorized to operate the check-out terminal 200, the server 160 will place the check-out terminal 200 into the attended operational mode.

In an attended mode of operation for the check-out terminal 200, the video terminal 210 may rotated on the rotatable base 214 to a first position where the display screen 212 of the video terminal 210 is approximately parallel with a front surface of the cash drawer 116. The receipt printer 118 may be attached to and rotate with the video terminal 210 via an attaching arm 228.

When the check-out terminal 200 is operated in the attended mode, the cash draw 116 may be opened and closed by operation of the video terminal 210 depending on the nature of a point of sale transaction. The check-out scale 112, the barcode scanner 114, and the magnetic stripe readers 218, 220 (if located separately from the video terminal 210) may be more conveniently arranged for operation by a cashier, or may be conveniently arranged for operation by both the cashier and a customer.

The server 160 may place the check-out terminal 200 in the self-service mode of operation after an authorized user logs off of the video terminal 210. When an authorized user logs off of the video terminal 210, the server 160 causes the cash drawer 116 to lock in a closed position. The video terminal 210 may be rotated on the rotatable base 214 to a second position where the display screen 212 of the video monitor 210 is approximately perpendicular with the front surface of the cash drawer 116. The receipt printer 118 may be attached to and rotate with the video terminal 210 via an attaching arm 228.

Point-of-sale transactions may be completed using the magnetic stripe readers 218, 220 to read credit cards and/or stored value cards. In addition, cash transactions may be performed with a cashier operating the cash drawer 116. In an embodiment, a customer may complete a transaction using a mobile device by, for example, but not limited to, displaying an optical code linked to a payment account and scanning the optical code with the barcode scanner 114.

In a self-service mode of operation for the check-out terminal 200 a number of the devices may be customer-facing. When the check-out terminal 200 is operated in the self-service mode, the check-out scale 112, the barcode scanner 114, and the magnetic stripe readers 218, 220 (if located separately from the video terminal 210) may be more conveniently arranged for operation by a customer. In the self-service mode, the cash drawer 116 may be locked. Point-of-sale transactions may be completed using the magnetic stripe readers 218, 220 to read credit cards and/or stored value cards. In addition, cash transactions may be performed using the cash accepting and dispensing unit 120. The cash accepting and dispensing unit 120 may be arranged as a customer-facing device and may be configured to accept cash and return a correct amount cash to complete a transaction. In an embodiment, a customer may complete a transaction using a mobile device by, for example, but not limited to, displaying an optical code linked to a payment account and scanning the optical code with the barcode scanner 114.

The check-out terminal 200 may also be operated in administrator modes for both the attended mode of operation and the self-service mode of operation to permit selected users to perform system supervisory and maintenance tasks. One of ordinary skill in the art will appreciate that the above examples for attended mode operation, self-service mode operation, and administrative mode operation are only non-limiting examples for illustrative purposes and that additional operational modes and operations within the operational modes are possible without departing from the scope of the present inventive concept.

Figure 6:
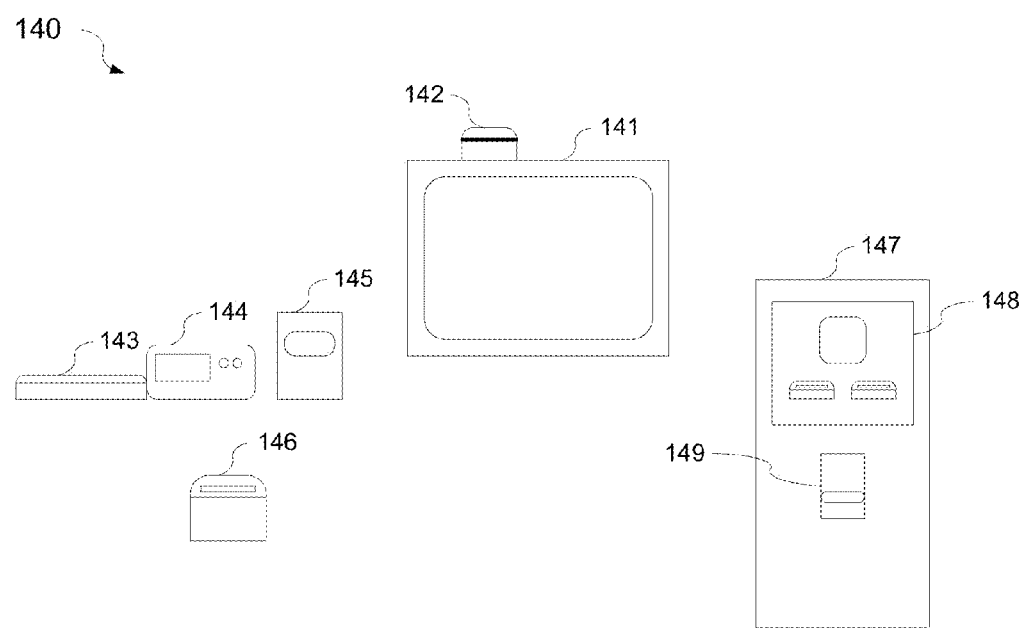
FIG. 6 is a diagram illustrating a stored value card station according to an example embodiment of the present inventive concept.

The point-of-sale system 100 may also perform point-or-sale transactions at a stored value card station using credit cards and stored value cards. The stored value card station may perform only credit card/stored value card transactions, including recharging a stored value card from a credit card, thereby permitting use of a physically smaller station. Using cash to recharge a stored value card may be accomplished at a recharging station. FIG. 6 is a diagram illustrating a stored value card station according to an example embodiment of the present inventive concept.

The stored value card station 140 may include tablet computer 141. The tablet computer 141 may provide control and communication for the stored value card station 140 and may execute application programs for conducting point of sale operations. The tablet computer 141 may communicate with the server 160 via a wired and/or wireless connection over the network 185. The tablet computer 141 may provide similar functions and screen displays as the video terminal 210 of the check-out terminal 200. One of ordinary skill in the art will appreciate that a general-purpose processor, microprocessor, or any conventional processor or controller (not shown) that may execute application programs for conducting point of sale operations may be used as an alternative to the tablet computer 141.

The stored value card station 140 may also include devices for performing checkout functions similar to the devices present at the check-out terminal 200, including but not limited one or more magnetic stripe readers 142, a checkout weight scale 143 and display unit 144, a barcode scanner 145, and a receipt printer 146.

The stored value card station 140 may also include a stored value card recharge unit 147 for adding value to a stored value card. Alternatively, the stored value card recharge unit 147 may be placed in a location separated from the stored value card station 140.

The stored value card recharge unit 147 may be configured to provide multiple functions and may include a general-purpose processor, microprocessor, or any conventional processor or controller (not shown) that may execute application programs for conducting operations to, for example, but not limited to, add value to stored value cards using cash, perform automatic teller machine (ATM) transactions, accept bill payments, vend event tickets, recharge prepaid cell phones, etc. The stored value card recharge unit 147 may include a bill acceptor/dispenser 148 for performing cash transaction. The stored value card recharge unit 147 may also include a dispensing unit 149 for dispensing items for example, but not limited to, stored value cards, tickets, etc.

With a stored value card, the value is stored on an account that associated with the card. Multiple stored value cards may access the same stored value account. Value may also be added to a stored value card via the stored value card recharge unit 147 at the stored value card station 140. In an example embodiment, an employee badge may be used in an on-site company cafeteria as a secure and unique method of identification to access a stored value account and make payments. Value may also be added to a stored value card via a wireless connection to the stored value card recharge unit 147 using a mobile device.

The point-of-sale system 100 may also support the ability to reconcile customer purchases across different point-of-sale system operators and different countries. In an example embodiment, value may be added to a stored value account at a point-of-sale system 100 in a first state and a purchase made at a point-of-sale system 100 in a second state with a stored value card associated to that stored value account. The point-of-sale system operator in the second state is paid by the point-of-sale system operator in the first state where payment was made to add value to the stored value card.

The point-of-sale system 100 may also collect detailed information about the buying patterns of customers, and may use that information to generate notifications that are sent to the customers to promote additional purchases of the same, similar, or alternative products.

In an example embodiment of the present inventive concept a point-of-sale system 100 may implement a loyalty program. The point-of-sale system operator may assign points to certain activities, for example, a high number of points may be given for purchasing expensive healthy items or for purchasing items during a specified time period. The loyalty points may then be redeemed for cash, prizes, or other items as determined by the point-of-sale system operator. The loyalty program may be tied to stored value accounts and may capture multiple balances in different sub-accounts. Different balances may be spent on different items. For example, a "healthy" account may be recharged when the customer buys healthy food or when they visit a gym or respond to a short survey. These stored value account balances may then be used to make purchases for healthy items.

One of ordinary skill in the art will appreciate that the above examples of loyalty programs are only non-limiting examples for illustrative purposes and that many other implementations are possible without departing from the scope of the present inventive concept.

Figure 7:
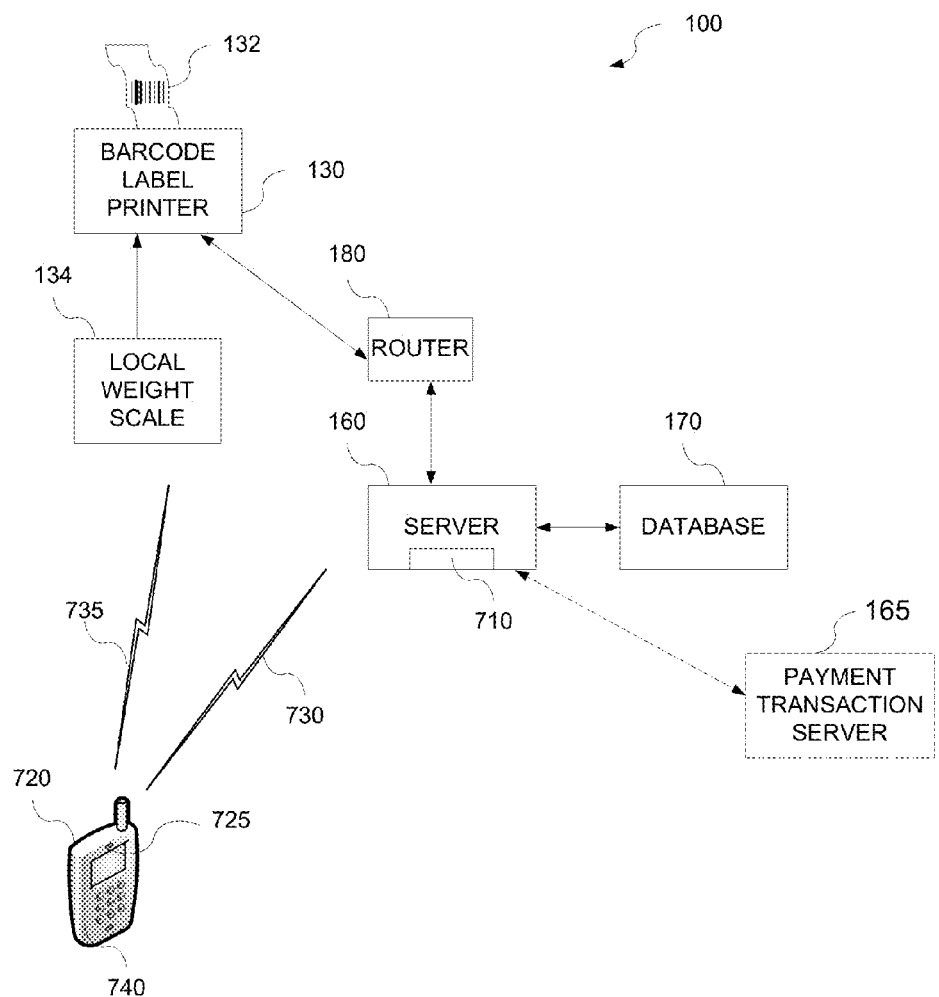
FIG. 7 is a diagram illustrating a point-of-sale system operable with a wireless communication device according to an example embodiment of the present inventive concept.

FIG. 7 is a diagram illustrating a point-of-sale system operable with a wireless communication device according to an example embodiment of the present inventive concept. Referring to FIG. 7, the point-of-sale system 100 may include one or more software and/or firmware applications 710 (also referred to herein as the server application 710) executing on the server 160 for communicating with a wireless communication device 720. The server application 710 may enable the server 160 to perform purchase and check-out operations initiated from the wireless communication device 720. The point-of-sale system 100 may be operated with the server 160 via a wireless communication connection 730 with the wireless communication device 720 using at least one mobile software and/or firmware application module 740 (also referred to herein as the mobile application module 740) executing on the wireless communication device 720 that enables the wireless communication device 720 to wirelessly communicate with the server 160 and perform product identification and selection, and purchase transactions.

In an example embodiment, the wireless communication device 720 executing the mobile application module 740 may be provided by the point-of-sale system operator. In an example embodiment, the wireless communication device 720 may be provided by the customer and the mobile application module 740 may be installed on the wireless communication device 720 by the customer.

The wireless communication device 720 and mobile application module 740 may be pre-registered to the point-of-sale system 100 with, for example, but not limited to user personal information and one or more financial account numbers. The server 160 and server application 710 may verify a user's identity based on the preregistered information using techniques known to those skilled in the art and upon successful verification authorize the user to access the point-of-sale system 100. The wireless communication device 720 and mobile application module 740 may also identify a user's location.

Product codes of items to be purchased may be scanned using a scanner/camera 725 on the wireless communication device 720. Alternatively or additionally, items to be purchased may be photographed using the scanner/camera 725 on the wireless communication device 720. Item information obtained by scanning a product code or photographing an item may be wirelessly transmitted to the server 160. The server 160 may access the database 170 for information, for example, but not limited to, product description information, price information, inventory information, authorization/verification information, etc. Product information and/or price may be wirelessly transmitted from the server 160 to the wireless communication device 720 via the server application 710 and the mobile application module 740.

The mobile application module 740 may enable the wireless communication device 720 to wirelessly communicate via a wireless connection 735 with a local weight scale 134 to weigh variable weight items. Product information and price per unit of weight may be stored in a memory (not shown) of the local weight scale 134 or may be requested and obtained from the server 160. In an example embodiment, a product code may be transmitted from the wireless communication device 720 to the local weight scale 134 and a price based on the product weight may be transmitted back to the wireless communication device 720 and/or to the point-of-sale system 100 server 160 and/or to a barcode label printer 130 to print a barcode label 132 for scanning by the wireless communication device 720. When product selection and identification is complete, the server application 710 and the mobile application module 740 operate in conjunction to verify and complete the purchase transaction.

The server 160 may communicate with the payment transaction server 165 via a secure payment application to obtain payment for the transaction. Since the wireless communication device 720 is registered with the point-of-sale system 100, a user account may be automatically electronically debited for a transaction. Transaction receipts may be provided by the server 160 via e-mail, SMS, or other electronic means. The electronic receipt may contain information about the purchase and may also contain coupons for future purchases. One of ordinary skill in the art will appreciate that these are only non-limiting examples for illustrative purposes and that many other implementations are possible without departing from the scope of the present inventive concept.

Figure 8:
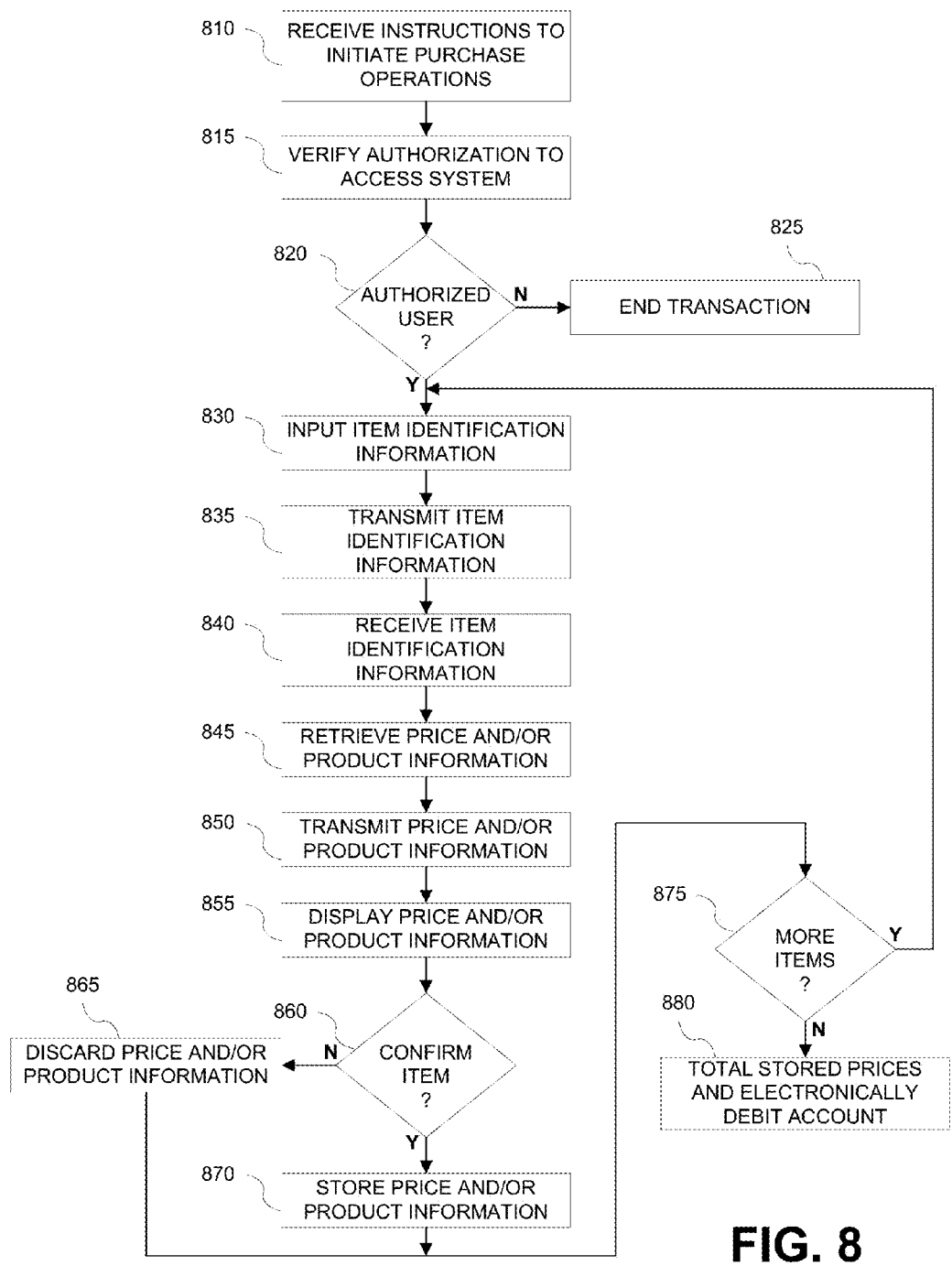
FIG. 8 is a flowchart illustrating a method for conducting a purchase transaction using a wireless communication device according to an example embodiment of the present inventive concept.

FIG. 8 is a flowchart illustrating a method for conducting a purchase transaction using a wireless communication device according to an example embodiment of the present inventive concept. Referring to FIG. 8, instructions to initiate operations for a purchase transaction may be received via a wireless communication link (810). The instructions may be wirelessly transmitted by a mobile communication device executing a mobile application module configured to enable wireless purchase transactions. The instructions may be received by a point-of-sale system server configured to conduct wireless purchase transactions. The instructions may be received by a server application executing on the point-of-sale system server. One of ordinary skill in the art will appreciate that any wireless communication technology may be used without departing from the scope of the present inventive concept.

The point-of-sale system server may verify that the mobile device is authorized to access the point-of-sale system to initiate purchase transaction (815). A user and mobile device may be associated to a mobile application module executing on the mobile device. Verification and authorization may be performed between the mobile application module and the server application using protocols known to those of ordinary skill in the art. If the user and mobile device are not authorized to access the point-of-sale system (820-N) the transaction is ended (825). Otherwise, the transaction proceeds (820-Y).

Item identification information may be input to the mobile communication device (830). The item identification information may be input by scanning a product code, by photographing the item, or by entering product information via a human interface device, for example, but not limited to, a graphical or mechanical keyboard, a mouse, a touchscreen, etc. The input item information may be transmitted to the point-of-sale system server (835). The point-of-sale system server may receive identification information about an item to be purchased via the server application from the mobile application module of the wireless communication device (840). The point-of-sale system server may retrieve price and/or product information from the database based on the identification information via the server application (845).

The point-of-sale system server may transmit via the server application the product information and/or price from the point-of-sale server to the mobile application module executing on the mobile communication device (850). The at least one of product information and price may be displayed on the mobile communication device by the mobile application module (855), and a confirmation that the item is to be purchased may be input to the mobile communication device and received by the mobile application module (860). If the item is not confirmed for purchase (860-N) the price and/or product information is discarded (865). If the item is confirmed for purchase (860-Y) the price and/or product information is stored (870). The method may return to operation 830 if more items to input (875-Y), otherwise (875-N), the server application may complete the purchase transaction by totaling the stored prices of the confirmed items (880) and automatically electronically debiting an account associated to the authorized user (890).

In an example embodiment of the present inventive concept, a point-of-sale system 100 may include an inventory monitoring system. Items scanned and purchased may be automatically entered by the point-of-sale system 100 into an inventory control system. The item entries into the inventory control system may be stored in the database 170. The database 170 or a portion of the database 170, may be, for example, but not limited to, a relational database. Inventory reports may be generated directly from the video terminal 210, thereby eliminating the need for frequent manual inventory operations. Inventory may also be adjusted from the software applications 710 executing on the server 160 so that the operator is notified for restocking.

Figure 9:
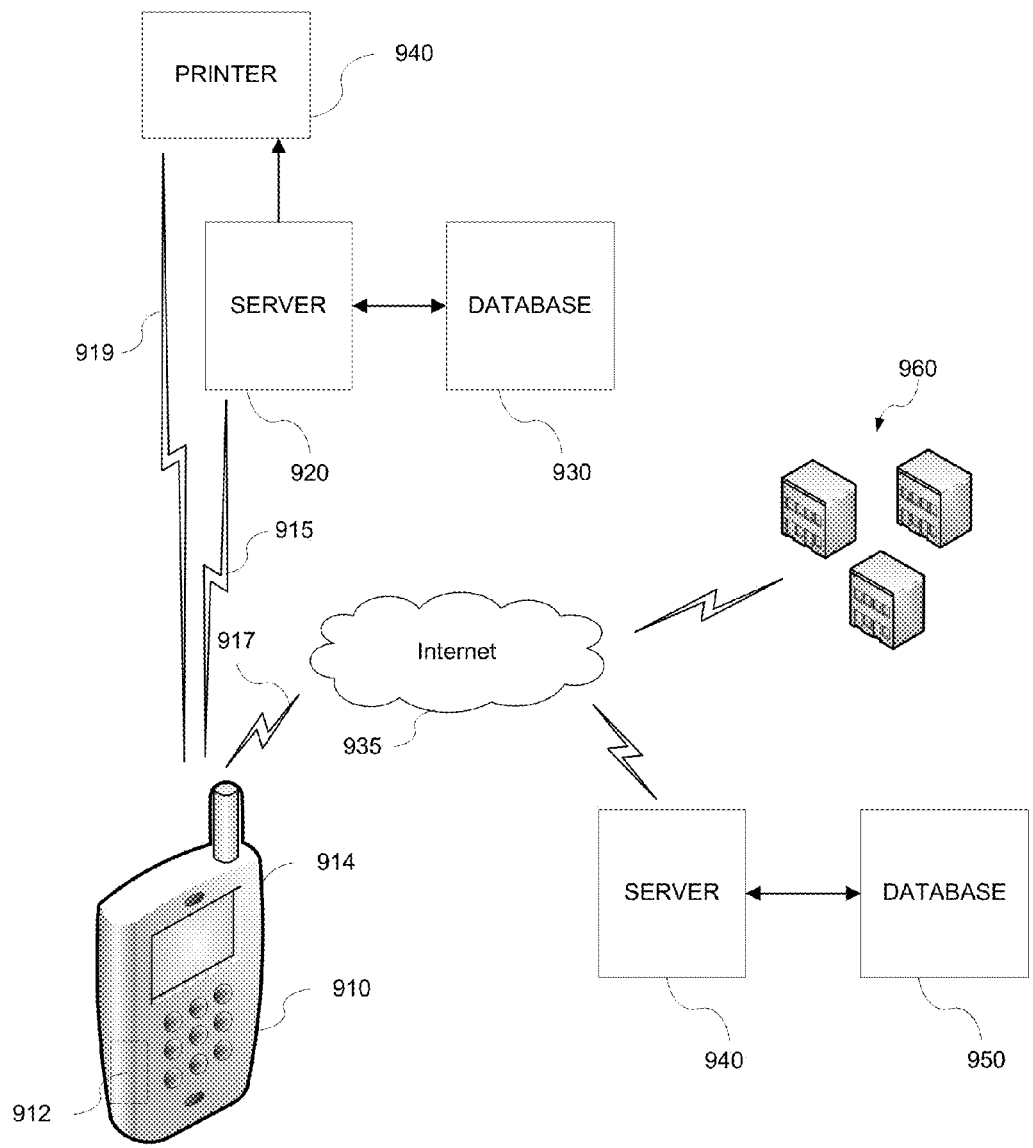
FIG. 9 is a diagram illustrating an inventory system according to an exemplary embodiment of the present inventive concept.

In an embodiment, the present inventive concept provides a system for managing inventory of items. FIG. 9 is a diagram illustrating an inventory system according to an exemplary embodiment of the present inventive concept. Referring to FIG. 9, the inventory system may include a mobile communication device 910, for example, but not limited to, a tablet or mobile phone, a server 920, a database 930, and a printer 940. A software and/or firmware application 912 executing on the mobile communication device 910 may provide an interactive user interface displayed on a display screen 914.

Figure 10:
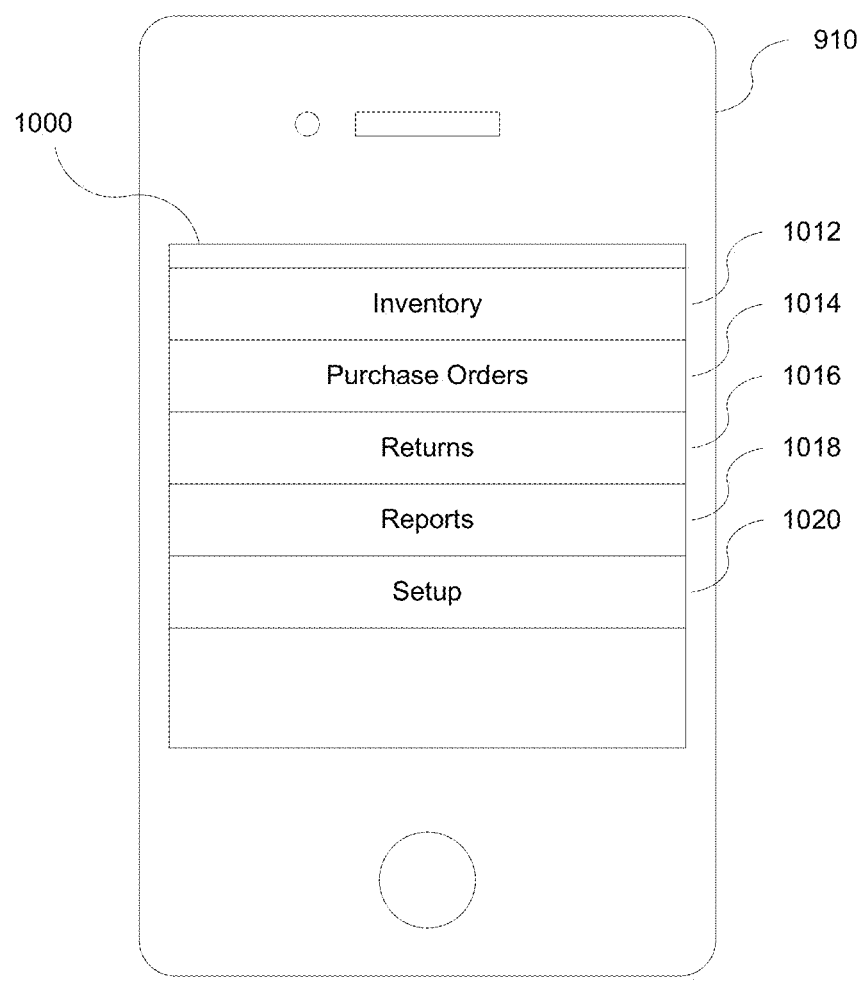
FIG. 10 is a diagram illustrating an option selection user interface according to an example embodiment of the present inventive concept.

FIG. 10 is a diagram illustrating an option selection user interface according to an example embodiment of the present inventive concept. As illustrated in FIG. 10, an option selection user interface 1000 may provide options for monitoring inventory 1012, generating purchase orders 1014, monitoring returned items 1016, generating inventory reports 1018, and application setup 1020. The user interface 1010 may enable counting and recording items currently in inventory and returned items, generate reports, and place purchase orders remotely through the mobile communication device 910.

Figure 11:
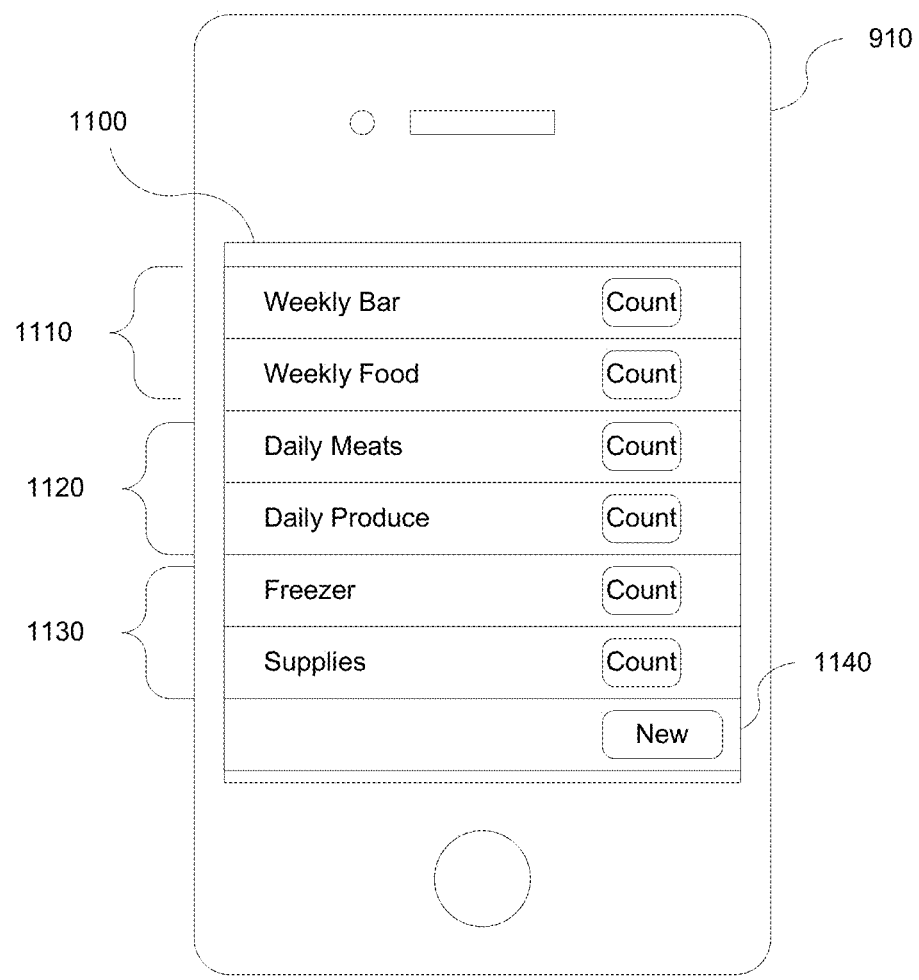
FIG. 11 is a diagram illustrating a category entry user interface in the inventory mode according to an example embodiment of the present inventive concept.

FIG. 11 is a diagram illustrating a category entry user interface in the inventory mode according to an example embodiment of the present inventive concept. Referring to FIGS. 10 and 11, when the inventory mode 1012 is selected from the option selection user interface 1000, a category entry user interface 1100 may items permit items to be categorized in various ways, for example, but not limited to, temporal categories and location-based categories. For example, non-perishable or less perishable items or items that are not quickly depleted from inventory may be placed in "weekly usage" categories 1110, while items that are more perishable or are quickly depleted from stock may be placed in "daily usage" categories 1120. Items may also be categorized by location, for example, in a refrigerator or freezer 1130. New categories may be added by selecting the "New" button 1140. One of ordinary skill in the art will appreciate that the foregoing are merely illustrative examples and that various other ways of categorizing items are possible without departing from the scope of the inventive concept.

Using the mobile communication device 910, a user may track inventory by entering items in their locations while walking around the premises. Selecting a category of items to inventory may open a user interface screen that lists items in the selected category.

Figure 12:
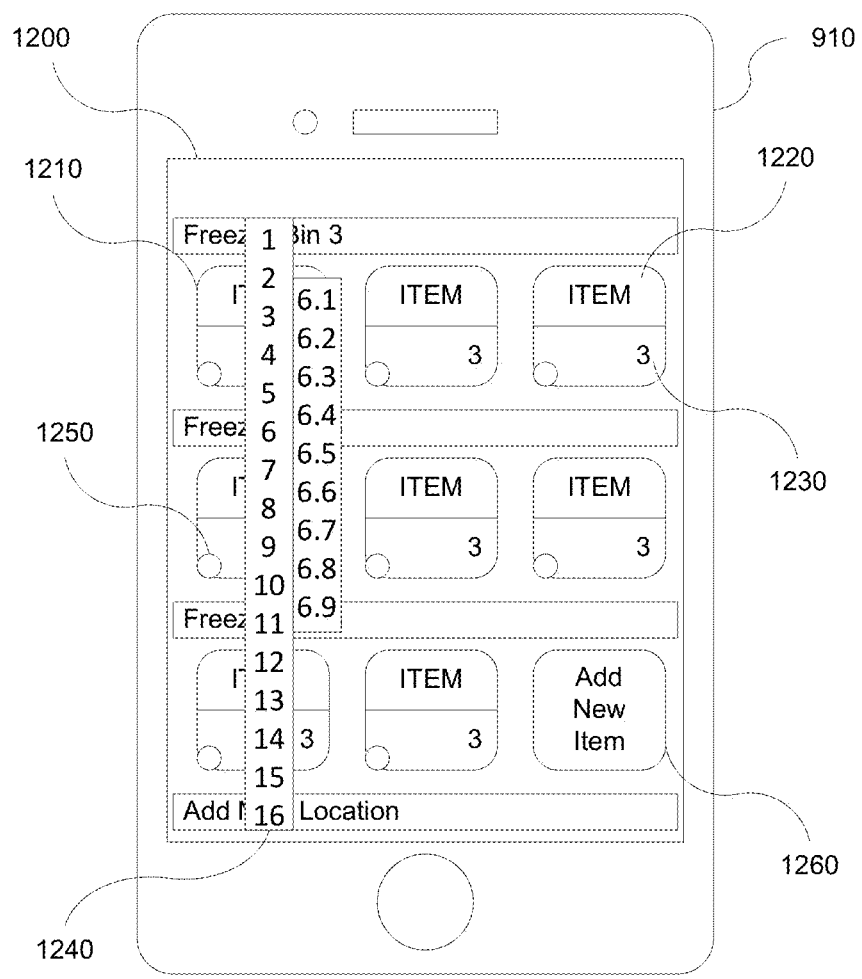
FIG. 12 is a diagram illustrating a multi-function button user interface in the inventory mode after selecting a category of items to inventory according to an example embodiment of the present inventive concept.

FIG. 12 is a diagram illustrating a multi-function button user interface in the inventory mode after selecting a category of items to inventory according to an example embodiment of the present inventive concept. Referring to FIGS. 10-12, the items may be represented graphically on the display screen 914 through an inventory mode user interface 1200, for example, but not limited to, by multi-function buttons 1210 on a touch screen, or as a textual list.

In the case of graphical multifunction buttons 1210, one button function 1220 may display one or more additional screens that provide details of the indicated item. Another function of the graphical multifunction button may be a counter, for example, but not limited to, a "spinner." One of ordinary skill in the art will appreciate that the foregoing are merely illustrative examples and that various other functions may be provided without departing from the scope of the inventive concept.

By selecting a "count" portion 1230 of the graphical multifunction button 1210, a counter 1240 may be activated to enter a value indicating the number of items in stock. A counted item may be automatically saved when the counter is exited and an indicator 1250 provided on the graphical multifunction button to indicate that the item has been counted and saved. New buttons may be added using an "Add" button 1260 for additional items.

Figure 13:
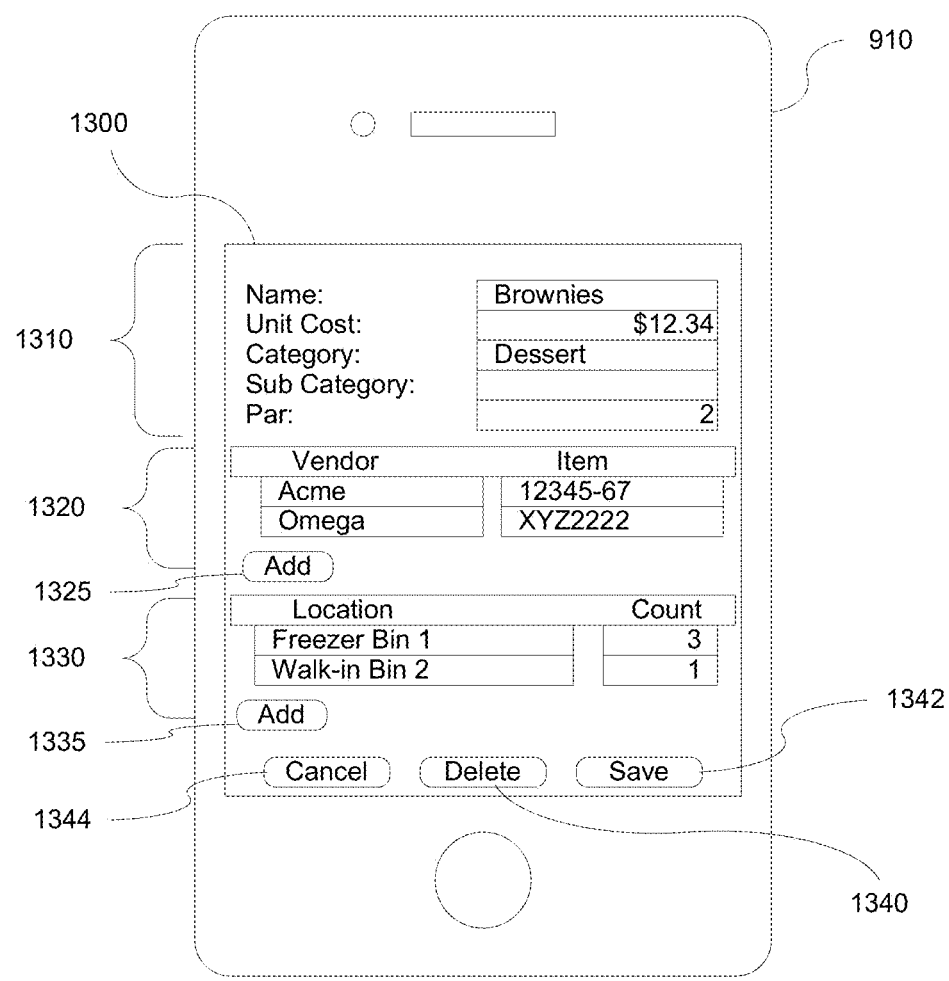
FIG. 13 is a diagram illustrating an item information user interface in the inventory mode after selecting a category of items to inventory according to an example embodiment of the present inventive concept.

Item details may include a vendor for a particular item. FIG. 13 is a diagram illustrating an item information user interface in the inventory mode after selecting a category of items to inventory according to an example embodiment of the present inventive concept. Referring to FIGS. 10-13, an item information user interface 1300 may permit entry of item information, for example, but not limited to, an item name, unit cost, category, sub-category, par value, etc., may be entered in an item description area 1310. Vendor information, for example, but not limited to, vendor name, stock number, etc., for the item may be entered in a vendor information area 1320. Additional vendors may be added using an "Add" button 1325. Item detail entries may be deleted, saved, or entry operations canceled using "Delete," "Save," and "Cancel" buttons 1340, 1342, 1344, respectively.

Location information, for example, but not limited to, locations within the establishment where an item is displayed, a quantity of the item at each location, etc., may be entered in a vendor information area 1330. Additional location information may be added using an "Add" button 1335.

Figure 14:
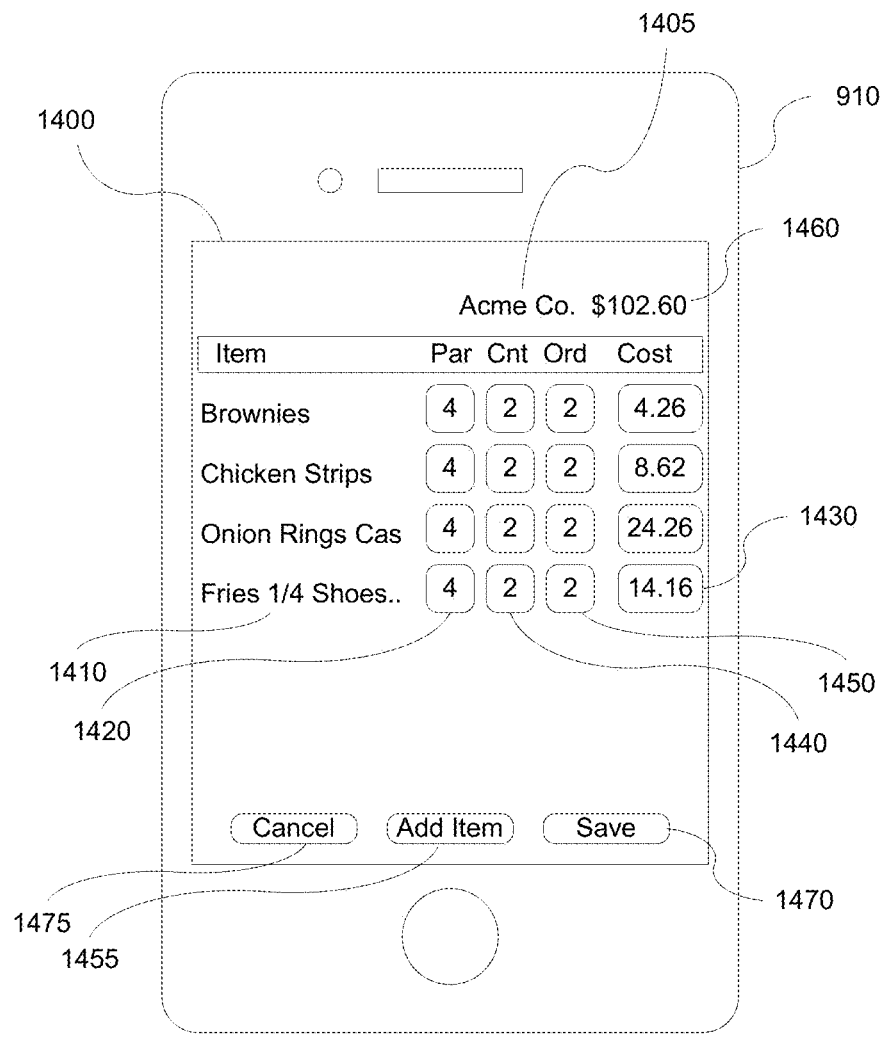
FIG. 14 is a diagram illustrating a user interface in the purchase order mode according to an example embodiment of the present inventive concept.

Purchase orders for each vendor may be automatically created. FIG. 14 is a diagram illustrating a user interface in the purchase order mode according to an example embodiment of the present inventive concept. Referring to FIGS. 10-14, when the purchase order option 1014 is selected from the option selection user interface 1000, a purchase order user interface 1400 may be displayed. A list of item information, for example, but not limited to, vendor information 1405, an item description 1410, par quantity 1420, and costs 1430 for each item may be pre-entered. A number of the items in inventory 1440 may be automatically entered from a count of the item obtained in inventory mode, and a number of items to be ordered 1450 from each vendor as well as the cost based on the inventory count 1460 may be calculated. Items may be added to the list using an "Add Item" button 1455.

Purchase orders may be sent electronically from the mobile communication device 910 using a "Save" button 1470, and the order confirmed electronically by the vendor. Alternatively or additionally, a purchase order may be printed using the printer 940. Purchase order operations may be terminated without creating a purchase order using a "Cancel" button 1475. Received orders may be verified using a receive option to verify items received against the submitted purchase order.

When the reports option 1018 is selected from the option selection user interface 1000, detailed inventory reports that include various parameters, for example, but not limited to, food and beverage costs, prime cost, etc., may be viewed on the mobile communication device 910 or printed on the printer 940. In addition, previous inventory reports may be viewed on the mobile communication device 910 or printed on the printer 940, but the previous reports may not be modified.

Selecting the returns option 1016 from the option selection user interface 1000 permits entry of returned items into the inventory count using a graphical user interface similar to the inventory mode user interface 1200 for counting items in inventory.

In an example embodiment, the mobile communication device 910 may communicate via a wireless link 916 over a local area network (LAN) with a local server 920 that maintains an inventory database 930. In an example embodiment, the mobile communication device 910 may communicate over the internet 935 via a wireless link 917 with a remote server 940 which maintains a remote inventory database 950. In an example embodiment, the mobile communication device 910 may also communicate over the internet 935 via the wireless link 917 with vendors 960 to place purchase orders, confirm orders, and track shipments. In an example embodiment, the mobile communication device 910 may communicate with the printer 940 via a wireless link 919 and/or through the local server 920 to print inventory reports and purchase orders. Various units and modules may be employed to implement the various functionalities, for example, graphical functionalities, mathematical functionalities, communication functionalities, etc., of the inventory management system.

The accompanying claims and their equivalents are intended to cover such forms or modifications as would fall within the scope and spirit of the protection. For example, the example apparatuses, methods, and systems disclosed herein can be applied to self-service or assisted customer check-out and inventory monitoring systems. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, units, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for conducting a purchase transaction using a wireless communication device, the method comprising:
   receiving from a mobile application module executing on a wireless communication device instructions to initiate a purchase transaction by a server application;
   verifying and authorizing the mobile application module by the server application;
   receiving from the mobile application module identification information about an item to be purchased to the server application;
   retrieving via the server application at least one of price and product information based on the identification information;
   completing the purchase transaction by automatically electronically debiting a user account,
   wherein the mobile communication device is configured to wirelessly communicate with a weight scale to weigh variable weight items, and
   the weight scale is configured to wirelessly transmit a price based on a weight of a variable weight item to the mobile communication device and at least one of the server and a barcode label printer.

2. The method of claim 1, further comprising transmitting the at least one of product information and price from the point-of-sale server to the wireless communication device.

3. The method of claim 1, wherein the item identification information is obtained by scanning a product code.

4. The method of claim 1, wherein the item identification information is obtained by photographing the item.

* * * * *